United States Patent
Sarkissian et al.

(10) Patent No.: US 11,644,544 B2
(45) Date of Patent: May 9, 2023

(54) LIDAR DEVICE INCLUDING A PSEUDO-RANDOM OPTICAL PHASED ARRAY

(71) Applicant: GM GLOBAL TECHNOLOGY OPERATIONS LLC, Detroit, MI (US)

(72) Inventors: Raymond Sarkissian, Studio City, CA (US); Keyvan Sayyah, Santa Monica, CA (US); Shuoqin Wang, Westlake, CA (US); Biqin Huang, Rancho Palos Verdes, CA (US); Ivan Alvarado, Santa Monica, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 523 days.

(21) Appl. No.: 16/814,726

(22) Filed: Mar. 10, 2020

(65) Prior Publication Data
US 2021/0124031 A1    Apr. 29, 2021

Related U.S. Application Data

(60) Provisional application No. 62/927,254, filed on Oct. 29, 2019.

(51) Int. Cl.
| | |
|---|---|
| *G01S 7/48* | (2006.01) |
| *G01S 7/481* | (2006.01) |
| *G01S 7/4911* | (2020.01) |
| *G01S 7/4912* | (2020.01) |
| *G01S 17/88* | (2006.01) |

(Continued)

(52) U.S. Cl.
CPC .......... *G01S 7/4818* (2013.01); *G01S 7/4813* (2013.01); *G01S 7/4814* (2013.01); *G01S 7/4815* (2013.01);

(Continued)

(58) Field of Classification Search
None
See application file for complete search history.

(56) References Cited

U.S. PATENT DOCUMENTS

| | | |
|---|---|---|
| 8,121,450 B2 | 2/2012 | Webster et al. |
| 2013/0209033 A1 | 8/2013 | Luff et al. |

(Continued)

OTHER PUBLICATIONS

Jacques, Samani, El-Fiky, Patel,Xing, Plant; Optimization of thermo-optic phase-shifter design and mitigation of thermal crosstalk on the SOI platform; Optics Express 10456; vol. 27, No. 8; Apr. 15, 2019.

(Continued)

*Primary Examiner* — Hwa Andrew Lee
(74) *Attorney, Agent, or Firm* — Quinn IP Law

(57) ABSTRACT

An architecture for a chip-scale optical phased array-based scanning frequency-modulated continuous wave (FMCW) Light-detection and ranging (LiDAR) device is described. The LiDAR device includes a laser, a transmit optical splitter, an optical circulator, photodetectors, and an optical phased array. The laser, the transmit optical splitter, the optical circulator, the photodetectors, and the optical phased array are arranged as a chip-scale package on a single semiconductor substrate. The laser generates a first light beam that is transmitted to the optical phased array aperture via the transmit optical splitter, the optical circulator, and the optical phased array. A fraction of the first light beam is transmitted to the photodetectors via the transmit optical splitter to serve as the optical local oscillator (LO), the aperture of the optical phased array captures a second light beam that is transmitted to the photodetectors via the optical phased array and the optical circulator.

18 Claims, 3 Drawing Sheets

(51) Int. Cl.
  G02B 6/12 (2006.01)
  G02B 6/122 (2006.01)
  G01S 17/10 (2020.01)
  G02F 1/095 (2006.01)
  B60R 11/00 (2006.01)
  G02F 1/01 (2006.01)

(52) U.S. Cl.
  CPC .......... G01S 7/4816 (2013.01); G01S 7/4817 (2013.01); G01S 7/4911 (2013.01); G01S 7/4916 (2013.01); G01S 17/10 (2013.01); G01S 17/88 (2013.01); G02B 6/12004 (2013.01); G02B 6/1228 (2013.01); G02F 1/0955 (2013.01); B60R 11/00 (2013.01); G02B 2006/1215 (2013.01); G02B 2006/12061 (2013.01); G02B 2006/12097 (2013.01); G02B 2006/12121 (2013.01); G02B 2006/12147 (2013.01); G02F 1/0147 (2013.01)

(56) References Cited

U.S. PATENT DOCUMENTS

| | | | |
|---|---|---|---|
| 2014/0376001 A1* | 12/2014 | Swanson | G01N 21/17 356/479 |
| 2018/0120433 A1 | 5/2018 | Eichenholz et al. | |
| 2019/0018110 A1 | 1/2019 | Kremer et al. | |
| 2019/0018114 A1 | 1/2019 | Patterson et al. | |
| 2019/0018120 A1 | 1/2019 | Efimov et al. | |
| 2019/0018139 A1 | 1/2019 | Sayyah et al. | |
| 2019/0018198 A1 | 1/2019 | Sayyah et al. | |
| 2019/0235053 A1 | 8/2019 | Spector | |
| 2019/0302268 A1 | 10/2019 | Singer et al. | |
| 2019/0302269 A1 | 10/2019 | Singer et al. | |
| 2019/0391406 A1 | 12/2019 | Chen | |
| 2020/0011994 A1 | 1/2020 | Thorpe et al. | |
| 2020/0049801 A1 | 2/2020 | Sayyah et al. | |
| 2020/0103502 A1* | 4/2020 | Talty | G01S 7/4812 |

OTHER PUBLICATIONS

Sacher, Mikkelsen, Huang, Mak, Yong, Luo, Li, Dumais, Jiang, Goodwill, Bernier, Lo, Poon Monolithically Integrated Multilayer Silicon Nitride-on-Silicon Waveguide Platforms for 3-D Photonic Circuits and Devices; IEEE vol. 106, No. 12; Dec. 2018.

Komljenovic, Bowers; Monolithically Integrated High-Q Rings for Narrow Linewidth Widely Tunable Lasers; IEEE vol. 51, No. 11; Nov. 2015.

* cited by examiner

LIDAR DEVICE INCLUDING A PSEUDO-RANDOM OPTICAL PHASED ARRAY

CROSS-REFERENCE TO RELATED APPLICATIONS

This application claims the benefit of U.S. Provisional Patent Application No. 62/927,254 filed on Oct. 29, 2019, the disclosure of which is hereby incorporated by reference.

INTRODUCTION

Light-detection and ranging (LiDAR) is an optical remote sensing technology that operates to acquire positional information of objects in a surrounding environment employing a light emitter and a light sensor. Operation of a LiDAR device includes illuminating objects in the surrounding environment with light pulses emitted from a light emitter, detecting light scattered by the objects using a light sensor such as a photodetector, and determining range of the objects based on the delay time of the scattered light reaching the sensor. The travel time of the light pulses to the photodetector can be measured, and a distance to an object can then be derived from the measured time. Detection and positional information related to objects in a surrounding environment may be enhanced by increased resolution of the LiDAR device.

A LiDAR device may employ light in the form of a pulse-modulated, frequency-modulated, or phase-modulated laser to measure ranges and other parameters of selected objects. It is desirable to provide a LiDAR device that is lightweight, physically small and is capable of providing reliable measurements.

SUMMARY

An architecture for a chip-scale optical phased array-based scanning frequency-modulated continuous wave (FMCW) Light-detection and ranging (LiDAR) device is described. The LiDAR device may be arranged to monitor a field of view. The LiDAR device includes a laser, a transmit optical splitter, an optical circulator, a set of photodetectors, and an optical phased array. The laser, the transmit optical splitter, the optical circulator, the set of photodetectors, and the optical phased array are arranged as a chip-scale package on a single semiconductor substrate. The laser generates a first light beam that is transmitted to the optical phased array aperture via the transmit optical splitter, the optical circulator, and the optical phased array. A fraction (5-10%) of the first light beam is transmitted to the set of photodetectors via the transmit optical splitter to serve as the optical local oscillator (LO), the aperture of the optical phased array captures a second light beam that is transmitted to the set of photodetectors via the optical phased array and the optical circulator. The second (received) light beam is optically mixed with the local oscillator light via the 2×2 coupler and the mixed beat signal is transmitted to the set of photodetectors.

An aspect of the disclosure includes the laser being a widely tunable (~100 nm) fully-integrated narrow linewidth master laser.

Another aspect of the disclosure includes the laser being frequency modulated to enable a scanning frequency modulated continuous wave (FMCW) LiDAR device.

Another aspect of the disclosure includes the set of photodetectors being a dual-balanced photodetector to eliminate laser intensity noise in the LiDAR receiver.

Another aspect of the disclosure includes a trans-impedance amplifier being in communication with the set of photodetectors.

Another aspect of the disclosure includes the transmit optical splitter directing a portions (90-95%) of the first light beam generated by the laser to the optical phased array via the optical circulator, and directing the remainder of the first light beam generated by the laser to the set of photodetectors.

Another aspect of the disclosure includes the optical phased array capturing the second light beam (LiDAR receive light) that is transmitted to the optical circulator, wherein the optical circulator directs this light beam to the set of photodetectors.

Another aspect of the disclosure includes the optical phased array including a set of optical splitters, a plurality of optical amplifiers, a plurality of phase shifters, and a plurality of optical antennas as the LiDAR aperture.

Another aspect of the disclosure includes the aperture being arranged as a single transmit and receive aperture.

Another aspect of the disclosure includes the plurality of optical antennas being grating couplers with uniform near field emission patterns.

Another aspect of the disclosure includes each of the plurality of optical antennas operating as a transmit antenna and a receive antenna.

Another aspect of the disclosure includes the semiconductor optical amplifiers (SOA) of the optical phased array being arranged to generate a power scalable optical phased array.

Another aspect of the disclosure includes the semiconductor optical amplifiers of the optical phased array being controllable to vary signal intensity of the first light beam that is generated by the laser.

Another aspect of the disclosure includes the semiconductor optical amplifiers of the optical phased array being controllable to vary signal intensity of the second (receive) light beam.

Another aspect of the disclosure includes the plurality of optical antennas of the optical phased array being fed coherent signals having intensities that vary based upon the optical amplifiers.

Another aspect of the disclosure includes the laser, the transmit optical splitter, the optical circulator, the set of photodetectors, and the optical phased array being arranged on a single semiconductor substrate, including the laser, the transmit optical splitter, the optical circulator, the set of photodetectors, and the optical phased array being arranged on a photonic integrated circuit including mixed silicon and silicon nitride integrated photonic platforms.

Another aspect of the disclosure includes a light detection and ranging (LiDAR) device that includes a laser, transmit optical splitter, a set of photodetectors, and an optical phased array, wherein the laser, the transmit optical splitter, the set of photodetectors, and the optical phased array are arranged as a chip-scale package on a single semiconductor substrate. The laser generates a first light beam that is transmitted to a first aperture of the optical phased array via the transmit optical splitter and the optical phased array. A portion of the first light beam is transmitted to the set of photodetectors to serve as the optical local oscillator via the transmit optical splitter, and a second aperture of the optical phased array captures a second light beam that is transmitted to the set of photodetectors via the optical phased array and is optically mixed with the local oscillator light.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of optical, mechanical and electrical hardware, sensors, controllers, application-specific integrated circuits (ASIC), combinatorial logic circuits, software, firmware, and/or other components that are arranged to provide the described functionality.

Figure 1:
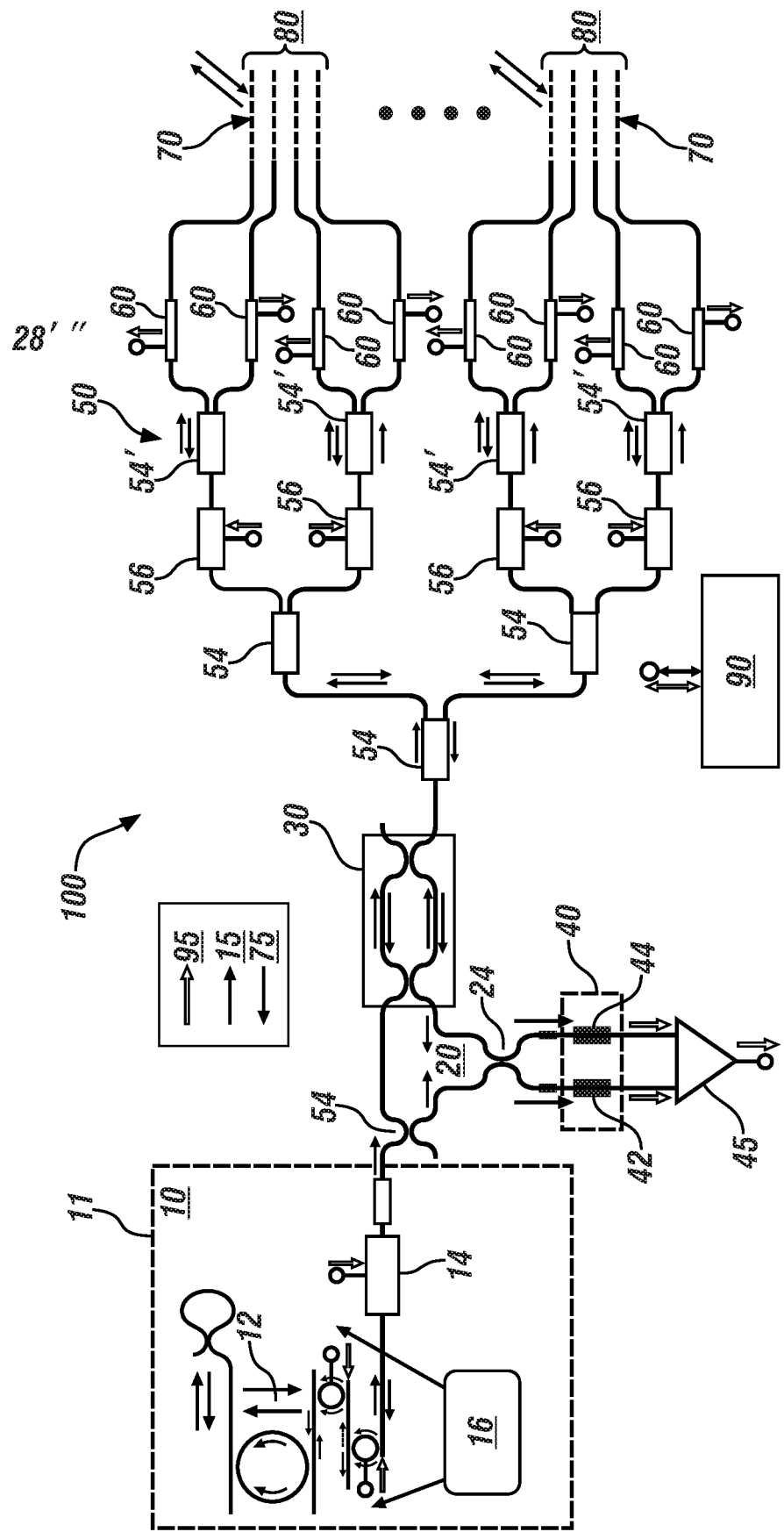
FIG. 1 schematically illustrates an embodiment of a light detection and ranging (LiDAR) device, in accordance with the disclosure.

Referring to the drawings, wherein like reference numerals correspond to like or similar components throughout the several Figures, FIG. 1, consistent with embodiments disclosed herein, schematically illustrates an embodiment of a light detection and ranging (LiDAR) device 100. The LiDAR device 100 described herein is configured as a chip-scale optical phased array based frequency-modulated continuous wave (FMCW) LiDAR device with features that include a single transmit and receive optical phase array (OPA) aperture enabled by the integration of a chip-scale optical circulator. This configuration reduces the chip footprint as compared to other systems. The LiDAR device 100 includes an array of fully-integrated semiconductor optical amplifiers (SOA) that are distributed among the array elements resulting in a power-scalable LiDAR transmitter and receiver. The LiDAR device 100 also includes a widely tunable (~100 nm), fully-integrated, narrow linewidth master laser, which enables wide angle scanning in the off-chip direction parallel to the OPA antennas. In an embodiment of this architecture, a mixed Si and SiN integrated photonic platform is used enabling the co-integration of the narrow linewidth laser source together with active Si photonic components such as Ge-on-Si photodiodes. Such a configuration may enable a mm-size OPA with mm-long optical antennas that enable transmit beams with very low divergence (<0.1°) with no free-space optics. Such a configuration may also enable implementation of a pseudo-random OPA, which results in LiDAR transmit beams with no grating lobes, hence reducing the complexity of FMCW beat signal detection and interpretation, and a compact (<1 cm$^2$) LiDAR sensor that may be enabled by the full integration of the laser, optical circulator and scanning mechanism in a single chip transmit/receive LiDAR aperture implementation.

Referring again to FIG. 1, one embodiment of the LiDAR device 100 is schematically illustrated, including a laser 10, a transmit optical splitter 20, an optical circulator 30, a set of photodetectors 40, including photodetectors 42 and 44 in one embodiment, and an optical phased array 50. The laser 10, the transmit optical splitter 20, the optical circulator 30, the set of photodetectors 40, and the optical phased array 50 are arranged as a chip-scale package on a single semiconductor substrate 120. The laser 10 generates a transmitted light beam 15 that is transmitted to an aperture 80 of the optical phased array 50 via the transmit optical splitter 20, the optical circulator 30, and the optical phased array 50. The laser 10, the transmit optical splitter 20, the optical circulator 30, the optical phased array 50, and the aperture 80 are interconnected via optical waveguides. A controller 90 is arranged to monitor and control various elements of the LiDAR device 100, with electrical signals employed for communication with the controller 90. Electrical signal communication between the controller 90 and the LiDAR device 100 is indicated by arrows 95.

The transmitted light beam 15 is transmitted to the set of photodetectors 40 via transmit optical splitter 20 via optical waveguides. The aperture 80 of the optical phased array 50 captures a second, received light beam 75 that is transmitted to the set of photodetectors 40 via the optical phased array 50 and the optical circulator 30. The aperture 80 interconnects via the optical phased array 50 to the set of photodetectors 40 via optical waveguides.

The LiDAR device 100 is arranged as a chip-scale package. A chip-scale package (CSP) is an optical and electronic integrated circuit package that includes surface-mount technology, and whose surface area is not more than 1.2 times an original die area. There are many benefits associated with chip-scale packages. Size reduction of the package is enabled due to flip-chip mounting of the OPA electronic driver application specific integrated circuit (ASIC) chip to the OPA electrical contact ports, indicated by numeral 11. Another advantage associated with this chip-scale package approach is self-alignment characteristics and the lack of bent leads, features which further help in lowering the manufacturing time and steps.

The laser 10 is a widely tunable (~100 nm), fully-integrated, narrow linewidth master laser 10, and in one embodiment is configured as a scanning frequency modulated continuous wave (FMCW) LiDAR optical transmitter. The laser 10 includes a tunable high-Q laser resonator 12, a tunable laser controller 16, and a semiconductor optical gain chip 14, which feeds via a 1×2 splitter 54 into the optical circulator 30 and the set of photodetectors 40 via the 2×2 coupler 24. The tunable high-Q laser resonator 12 includes, in one embodiment, a micro-ring or a waveguide grating-based high quality factor (Q) integrated optical resonator.

The set of photodetectors 40 includes photodetectors 42 and 44, which are arranged in a dual balanced photodetector configuration set and connected to a trans-impedance amplifier 45.

The trans-impedance amplifier 45 is in communication with the photodetectors 42 and 44, and generates an output signal that is communicated to the controller 90.

The transmit optical splitter 20 directs the transmitted light beam 15 generated by the laser 10 to the optical phased array 50 via the optical circulator 30, and directs the local oscillator light beam 15 generated by the laser 10 to the set of photodetectors 40.

The optical circulator 30 is configured as a chip-scale component that separates optical signals that travel in opposite directions in the optical waveguides connected to it. The optical circulator 30 is a three- or four-port optical device designed such that light entering any port exits from the adjacent port. Optical circulators are used to separate optical signals that travel in opposite directions in an optical medium (such as optical fiber or waveguide), for example to achieve bi-directional transmission over a single fiber or waveguide. The optical circulator 30 may include an integrated optical circulator 30 that includes an unbalanced Mach-Zehnder or micro-ring resonator based optical circulator 30 that is integrated with a magneto-optical material. The operation wavelength of the integrated optical circulator 30 is tunable using an electro-optic or a thermo-optic effect induced in its optical waveguide(s).

The optical phased array 50 captures the second, received light beam 75 that is transmitted to the optical circulator 30, and the optical circulator 30 directs the received light beam 75 to the set of photodetectors 40. In one embodiment, the optical phased array 50 may be configured as an integrated two-dimensional scanning optical phased array (OPA) with a fully integrated photonic integrated circuit (PIC). Phased-array optics is the technology of controlling the phase and amplitude of light waves transmitting, reflecting, or received by a two-dimensional surface using adjustable surface elements. An optical phased array (OPA) is the optical analog of a radio wave phased array. By dynamically controlling the optical properties of a surface on a microscopic scale, the light beams are steered into an OPA transmitter, or the view direction of sensors in an OPA receiver, without moving parts. Phased array beam steering is used for optical switching and multiplexing in optoelectronic devices, and for aiming laser beams. The PIC facilitates integrating, for example, lasers, modulators, detectors, and filters on a single semiconductor, typically silicon or indium phosphide.

The optical phased array 50 includes a plurality of 1×2 optical splitters 54 a plurality of semiconductor optical amplifiers 56, a plurality of phase shifters 60, a plurality of optical antennas 70, and the aperture 80, all of which are interconnected by optical waveguides. The aperture 80 is arranged as a single transmit and receive aperture. Scanning in the direction perpendicular to the antennas of the OPA are enabled by the phase control of the phase shifters 60, and in the direction parallel to the antennas are enables via wavelength control of the tunable laser 10.

The optical phase array 50 is configured as follows in this embodiment. A first of the 1×2 optical splitters 54 interconnects with the optical circulator 30, and is connected in series with a pair of the 1×2 optical splitters 54 and arranged in a cascaded configuration of N branches. The outputs of the pairs of a number of the 1×2 optical splitters 54 are each connected to one of the semiconductor optical amplifiers 56, which are connected to a second set of the 1×2 optical splitters 54', each which feeds into one of a plurality of phase shifters 60, which lead into respective optical antennas 70. The semiconductor optical amplifiers 56 and the phase shifters 60 communicate with and are controlled by the controller 90. It should be noted that is some embodiments, the semiconductor optical amplifiers 56 are also placed in the higher order splits of the optical phased array in order to produce a higher transmit optical power level.

The plurality of optical antennas 70 are mm-long optical antennas that include grating couplers with uniform near-field emission patterns. Each of the plurality of optical antennas 70 operates as a transmit antenna and as a receive antenna.

The semiconductor optical amplifiers (SOAs) 56 of the optical phased array 50 are arranged to generate a power-scalable optical phased array. The SOAs 56 of the optical phased array 50 are controllable to vary signal intensity of the transmitted light beam 15 that is generated by the laser 10. The SOAs 56 of the optical phased array 50 are controllable to vary signal intensity of the received light beam 75 as well.

The plurality of optical antennas 70 of the optical phased array 50 are fed coherent signals having intensities that vary based upon the SOAs 56.

The laser 10, the transmit optical splitter 20, the optical circulator 30, the set of photodetectors 40, and the optical phased array 50 are arranged on a single semiconductor substrate. This includes the laser 10, the transmit optical splitter 20, the optical circulator 30, the set of photodetectors 40, and the optical phased array 50 being arranged on a silicon integrated photonic platform that is fabricated from mixed silicon and silicon nitride in one embodiment. A feedback circuit provides for the tunable laser wavelength control and stabilization.

Figure 2:
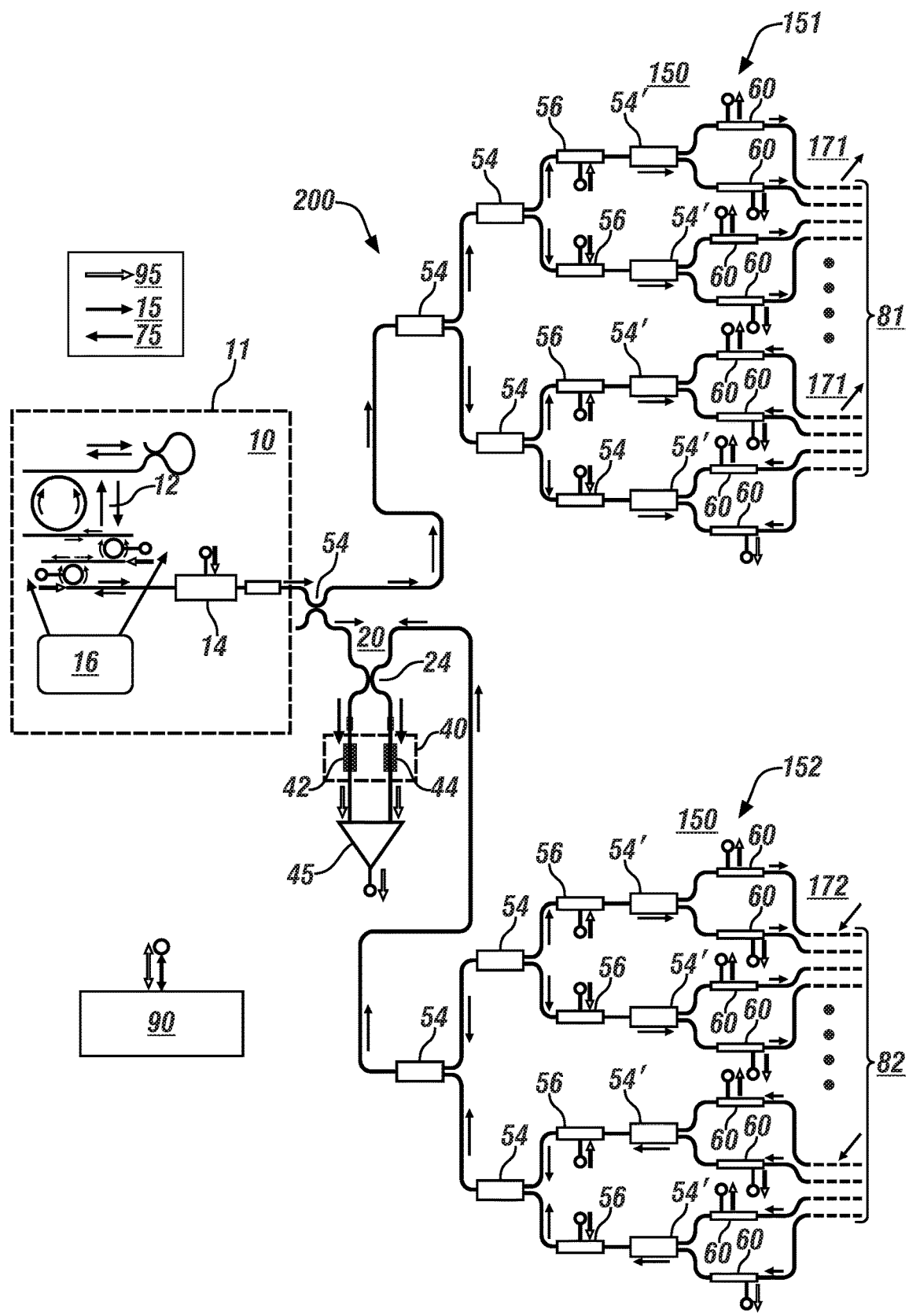
FIG. 2 schematically illustrates another embodiment of a LiDAR device, in accordance with the disclosure.

FIG. 2 schematically illustrates a second embodiment of the LiDAR device 200, which is analogous to the LiDAR device 100 illustrated with reference to FIG. 1. The LiDAR device 200 described herein is configured as a chip-scale optical phased array based frequency-modulated continuous wave (FMCW) LiDAR device with features that include a transmit and receive optical phase array (OPA) having separate dual apertures for transmitting and receiving.

The LiDAR device 200 includes laser 10, transmit optical splitter 20, set of photodetectors 40, and a dual-aperture optical phased array 150. The dual-aperture optical phased array 150 is configured to include a transmit optical phased array 151 and a receive optical phased array 152.

The laser 10, the transmit optical splitter 20, the set of photodetectors 40, and the dual-aperture optical phased array 150 are arranged as a chip-scale package on a single semiconductor substrate. The laser 10 generates a transmitted light beam 15 that is transmitted to a transmit aperture 81 of the optical phased array 50 via the transmit optical splitter 20, and the transmit optical phased array 151. The laser 10, the transmit optical splitter 20, the transmit optical phased array 151, and the transmit aperture 81 are interconnected via optical waveguides. A controller 90 is arranged to monitor and control various elements of the LiDAR device 100, with electrical signals employed for communication with the controller 90.

A portion (5-10%) of the laser light beam 15 is transmitted to the set of photodetectors 40 via transmit optical splitter 20 as the LiDAR local oscillator light, which are interconnected via optical waveguides.

The receive aperture 82 of the optical phased array 50 captures the second, received light beam 75 that is transmitted to the set of photodetectors 40 via the receive optical phased array 152. The transmit and receive apertures 81, 82 interconnect via the optical phased array 50 to the set of photodetectors 40 via optical waveguides. The local oscillator and receive light beams are optically mixed via the 2×2 coupler 24 before transmitting to the set of photodetectors 40.

The LiDAR device 100 is arranged as a chip-scale package. A chip-scale package (CSP) is an optical and electronic integrated circuit package that includes surface-mount technology, and whose surface area is not more than 1.2 times an original die area. There are many benefits associated with chip-scale packages. Size reduction of the package compared to traditional packages is enabled due to flip-chip mounting of the OPA electronic driver application specific integrated circuit (ASIC) chip 11 to the OPA electrical contact ports. Another advantage associated with this chip-scale package approach is self-alignment characteristics and the lack of bent leads, features which further help in lowering the manufacturing time and steps.

The laser 10 is a widely tunable (~100 nm) fully-integrated narrow linewidth master laser 10, and in one embodiment is configured as a scanning frequency modulated continuous wave (FMCW) laser. The laser 10 includes a tunable high-Q laser resonator 12, a tunable laser controller 16, and a semiconductor gain chip 14, which feeds via a 1×2 splitter 54 into the set of photodetectors 40. The tunable high-Q laser resonator 12 includes, in one embodiment, a micro-ring or a waveguide grating-based high quality factor (Q) integrated optical resonator.

The set of photodetectors 40 is arranged as a dual balanced photodetector set both of which are connected to a trans-impedance amplifier 45. The trans-impedance amplifier 45 is in communication with the photodetectors 42 and 44, and generates an output signal that is communicated to the controller 90.

The transmit optical splitter 20 directs the transmitted light beam 15 generated by the laser 10 to the optical phased array 50, and directs a portion (5-10%) of the light beam 15 generated by the laser 10 to the set of photodetectors 40 as the LiDAR local oscillator light. The transmit optical phased array 151 and the receive optical phased array 152 of the optical phased array 150 each includes a plurality of 1×2 optical splitters 54, 54', a plurality of semiconductor optical amplifiers 56, and a plurality of phase shifters 60. The transmit optical phased array 151 includes a plurality of transmit optical antennas 171 coupled to the first, transmit aperture 81, and the receive optical phased array 152 includes a plurality of receive optical antennas 172 that are coupled to the second, receive aperture 82.

The transmit optical phase array 151 is configured as follows in this embodiment. A first of the 1×2 optical splitters 54 interconnects with a pair of the 1×2 optical splitters 54 and arranged in a cascaded configuration of N branches. The outputs of the pairs of the 1×2 optical splitters 54 are each connected to one of the semiconductor optical amplifiers 56, which are connected to a second set of the 1×2 optical splitters 54', each which feeds into one of a plurality of phase shifters 60, which lead into respective transmit optical antennas 171. The semiconductor optical amplifiers 56 and the phase shifters 60 communicate with and are controlled by the controller 90. It should be noted that in some embodiments, the semiconductor optical amplifiers 56 are also placed in the higher order splits of the optical phased array in order to produce a higher transmit and receive optical power levels.

The receive optical phase array 152 is configured as follows in this embodiment. A first of the 1×2 optical splitters 54 is connected in series with a pair of the 1×2 optical splitters 54 and arranged in a cascaded configuration of N branches. The outputs of the pairs of the 1×2 optical splitters 54 are each connected to one of the semiconductor optical amplifiers 56, which are connected to a second set of the 1×2 optical splitters 54', each which feeds into one of a plurality of phase shifters 60, which lead into respective receive optical antennas 172. The semiconductor optical amplifiers 56 and the phase shifters 60 communicate with and are controlled by the controller 90. The optical antennas 171, 172 are mm-long optical antennas that include grating couplers with uniform near-field emission patterns.

The laser 10, the transmit optical splitter 20, the set of photodetectors 40, and the optical phased array 50 are arranged on a single semiconductor substrate. This includes the laser 10, the transmit optical splitter 20, the set of photodetectors 40, and the optical phased array 150 being arranged on a silicon integrated photonic platform that is fabricated from mixed silicon and silicon nitride in one embodiment, with a feedback circuit providing for wavelength control and stabilization.

Figure 3:
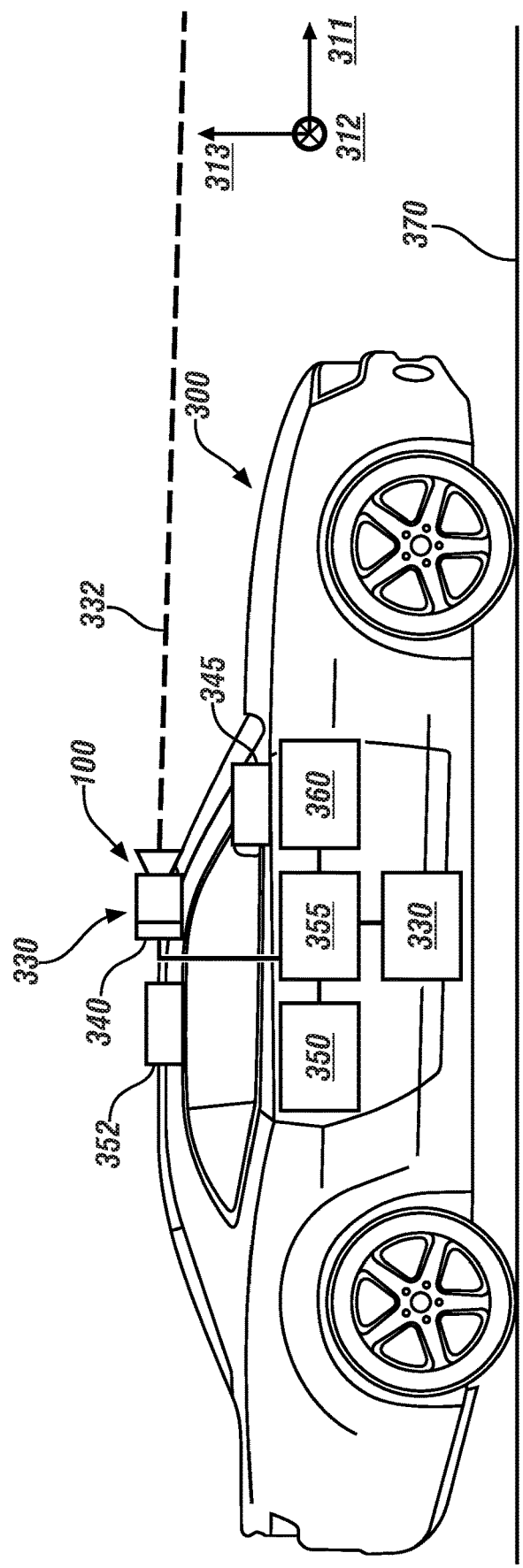
FIG. 3 schematically illustrates an embodiment of a LiDAR device, wherein the LiDAR sensor is an element of a spatial monitoring system that is disposed on a vehicle to monitor a field of view, in accordance with the disclosure.

FIG. 3 schematically illustrates a vehicle 300 that employs a LiDAR system 330 that includes either an embodiment of the LiDAR device 100 that is described with reference to FIG. 1 (as shown), or an embodiment of the LiDAR device 200 that is described with reference to FIG. 2. In one embodiment, and as described herein, the LiDAR system 330 is an element of a spatial monitoring system 340 including a spatial monitoring controller 355 that is disposed on the vehicle 300. The concepts described herein may be employed on various systems that may benefit from information determined from an embodiment of the LiDAR system 330.

A side-view of the vehicle 300 is shown, which is disposed on and able to traverse a travel surface 370 such as a paved road surface. The vehicle 300 and the travel surface 370 define a three-dimensional coordinate system including a longitudinal axis 311, a lateral axis 312 and an attitudinal axis 313. The longitudinal axis 311 is defined as being equivalent to a direction of travel of the vehicle 300 on the travel surface 370. The lateral axis 312 is defined as being equivalent to orthogonal to the direction of travel of the vehicle 300 on the travel surface 370. The attitudinal axis 313 is defined as being orthogonal to a plane defined by the longitudinal axis 311 and the lateral axis 312, i.e., as projecting perpendicular to the travel surface 370.

The LiDAR system 330 is disposed on the vehicle 300 to monitor a viewable region 322 that is proximal to the vehicle 300. In one embodiment, the viewable region 332 is forward of the vehicle 300. The vehicle 300 may also include a vehicle controller 350, a global navigation satellite system (GNSS) sensor 352, a human/machine interface (HMI) device 345. The LiDAR system 330 employs pulsed or frequency modulated laser beam to measure range or distance to an object. When employed in combination with information from the GNSS sensor 352, the spatial monitoring controller 355 is able to determine geospatial locations of objects that are in the viewable region 332 of the vehicle 300.

The spatial monitoring system 340 may include other spatial sensors and systems that are arranged to monitor the viewable region 332 forward of the vehicle 300 include, e.g., a surround-view camera, a forward-view camera, and a radar sensor, which may be employed to supplement or complement spatial information that is generated by the LiDAR system 330. Each of the spatial sensors is disposed on-vehicle to monitor all or a portion of the viewable region 332 to detect proximate remote objects such as road features, lane markers, buildings, pedestrians, road signs, traffic control lights and signs, other vehicles, and geographic features that are proximal to the vehicle 300. The spatial monitoring controller 355 generates digital representations of the viewable region 332 based upon data inputs from the spatial sensors. The spatial monitoring controller 355 can evaluate inputs from the spatial sensors to determine a linear range, relative speed, and trajectory of the vehicle 300 in view of each proximate remote object. The spatial sensors can be located at various locations on the vehicle 300, including the front corners, rear corners, rear sides and mid-sides. The spatial sensors can include a front radar sensor and a camera in one embodiment, although the disclosure is not so limited. Placement of the spatial sensors permits the spatial monitoring controller 355 to monitor traffic flow including proximate vehicles, intersections, lane markers, and other objects around the vehicle 300. Data generated by the spatial monitoring controller 355 may be employed by a lane marker detection processor (not shown) to estimate the roadway. As employed herein, the terms "proximate", "proximal" and related terms refer to stationary and mobile objects that are in the vicinity of the vehicle 300 such that they are discernible by one or more of the spatial sensors connected to the spatial monitoring controller 355 including the LiDAR system 330.

Other on-vehicle systems may include, by way of non-limiting examples, an on-board navigation system, a computer-readable storage device or media (memory) that includes a digitized roadway map, an autonomous control system, an advanced driver assistance system, a telematics controller, etc., all of which are indicated by element 360. The vehicle 300 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

One embodiment of the light detection and ranging (LiDAR) device that is a chip-scale package on a single semiconductor substrate operates as follows. The laser generates a first light beam that is transmitted to an aperture of the optical phased array via the transmit optical splitter, the optical circulator, and the optical phased array. A portion of the first light beam is transmitted to the set of photodetectors via the transmit optical splitter. The aperture of the optical phased array captures a second, reflected light beam that is transmitted to the set of photodetectors via the optical phased array and the optical circulator.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which can be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A light detection and ranging (LiDAR) device, comprising:
   a laser, a transmit optical splitter, an optical circulator, a set of photodetectors, and an optical phased array;
   wherein the optical phased array comprises a pseudo-random optical phased array;
   wherein the laser, the transmit optical splitter, the optical circulator, the set of photodetectors, and the optical phased array are arranged as a chip-scale package on a single semiconductor substrate;
   wherein the laser is configured to generate a first light beam that is transmitted to an aperture of the optical phased array via the transmit optical splitter, the optical circulator, and the optical phased array;

wherein a portion of the first light beam is transmitted to the set of photodetectors via the transmit optical splitter; and wherein the aperture of the optical phased array is configured to capture a second light beam that is transmitted to the set of photodetectors via the optical phased array and the optical circulator.

2. The LiDAR device of claim 1, wherein the laser comprises a tunable fully-integrated narrow linewidth master laser.

3. The LiDAR device of claim 1, wherein the laser comprises a scanning frequency modulated continuous wave (FMCW) coherent light generation device.

4. The LiDAR device of claim 1, wherein the set of photodetectors comprises a dual-balanced photodetector.

5. The LiDAR device of claim 1, further comprising a trans-impedance amplifier in communication with the set of photodetectors.

6. The LiDAR device of claim 1, wherein the transmit optical splitter is configured to direct the first light beam generated by the laser to the optical phased array via the optical circulator, and is configured to direct the first light beam generated by the laser to the set of photodetectors.

7. The LiDAR device of claim 1, wherein the optical phased array is configured to capture the second light beam that is transmitted to the optical circulator; and wherein the optical circulator is configured to direct the second light beam to the set of photodetectors.

8. The LiDAR device of claim 1, wherein the optical circulator comprises a chip-scale component used to separate optical signals that travel in opposite directions in an optical waveguide.

9. The LiDAR device of claim 1, wherein the optical phased array comprises a set of optical splitters, a plurality of optical amplifiers, a plurality of phase shifters, and a plurality of optical antennas and the aperture.

10. The LiDAR device of claim 9, wherein the aperture is arranged as a single transmit and receive aperture.

11. The LiDAR device of claim 9, wherein the plurality of optical antennas comprises grating couplers with uniform near field emission patterns.

12. The LiDAR device of claim 9, wherein each of the plurality of optical antennas is configured to operate as a transmit antenna and a receive antenna.

13. The LiDAR device of claim 9, wherein the plurality of optical amplifiers of the optical phased array are arranged to generate a power-scalable optical phased array.

14. The LiDAR device of claim 9, wherein the plurality of optical amplifiers of the optical phased array are controllable to vary signal intensity of the first light beam that is generated by the laser.

15. The LiDAR device of claim 9, wherein the optical amplifiers of the optical phased array are controllable to vary signal intensity of the second light beam.

16. The LiDAR device of claim 9, wherein the plurality of optical antennas of the optical phased array are fed coherent signals having intensities that vary based upon the optical amplifiers.

17. The LiDAR device of claim 1, wherein the laser, the transmit optical splitter, the optical circulator, the set of photodetectors, and the optical phased array being arranged on a single semiconductor substrate comprises the laser, the transmit optical splitter, the optical circulator, the set of photodetectors, and the optical phased array being arranged on a silicon integrated photonic platform including mixed silicon and silicon nitride.

18. The LiDAR device of claim 1, further comprising a single 2×2 coupler arranged between the laser, the transmit optical splitter, and the optical circulator, wherein local oscillator and receive light beams are optically mixed via the single 2×2 coupler.

* * * * *